Jan. 20, 1925.  
L. BROWN  
1,523,857  
FILM HOLDING MECHANISM FOR KINETOGRAPHS.  
Filed Aug. 31, 1921  
4 Sheets-Sheet 2
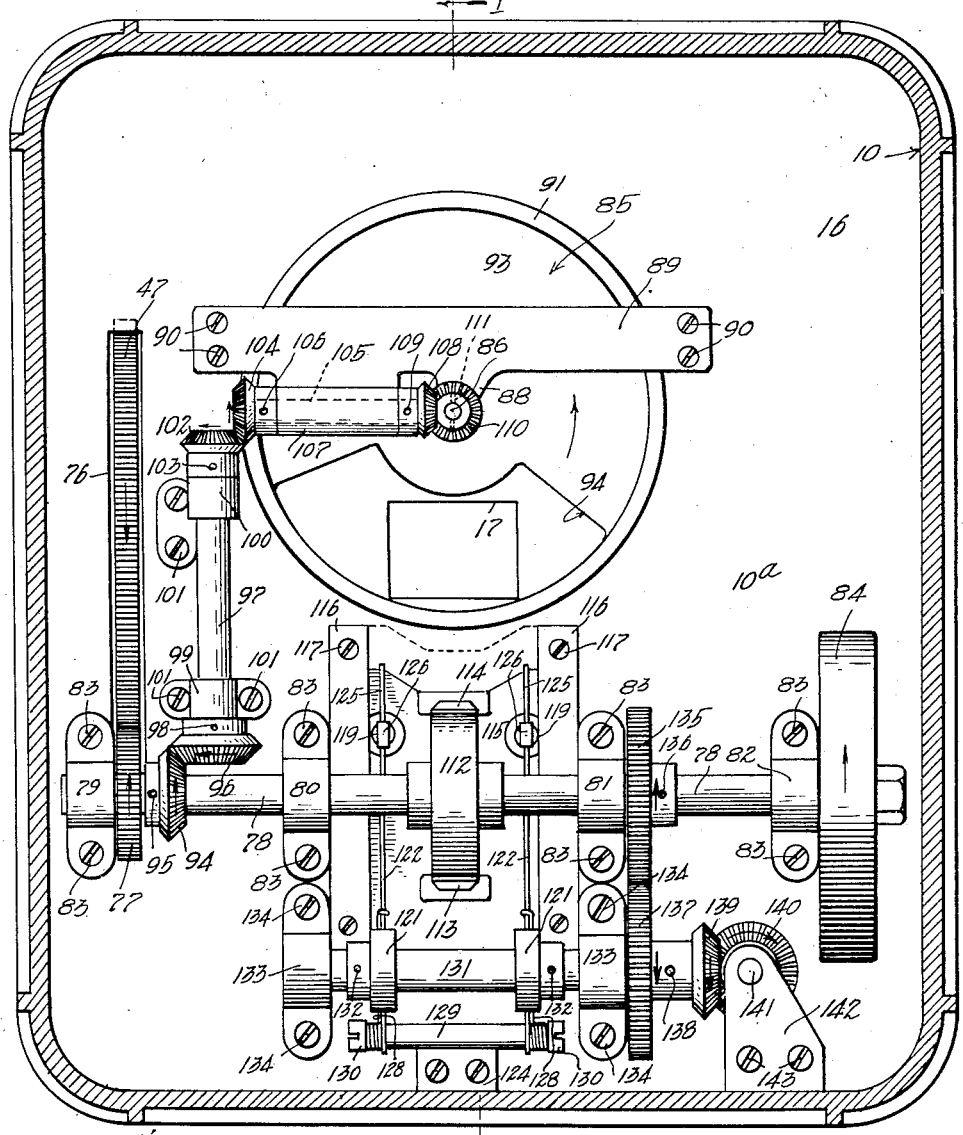
Fig.2.
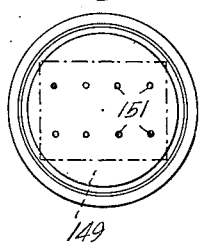
Fig.?
Inventor:  
Lloyd Brown,  
By James T. Barkeler  
his Attorneys Jan. 20, 1925.

L. BROWN 1,523,857

FILM HOLDING MECHANISM FOR KINETOGRAPHS

Filed Aug. 31, 1921    4 Sheets-Sheet 3

Inventor:
Lloyd Brown
By James T. Barkelew
his Attorneys

Jan. 20, 1925.  
L. BROWN  
1,523,857  
FILM HOLDING MECHANISM FOR KINETOGRAPHS  
Filed Aug. 31, 1921  
4 Sheets—Sheet 4
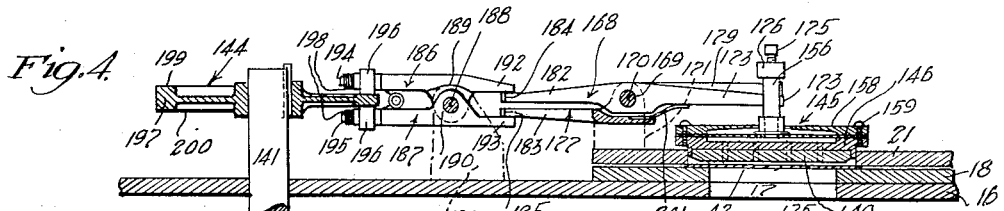
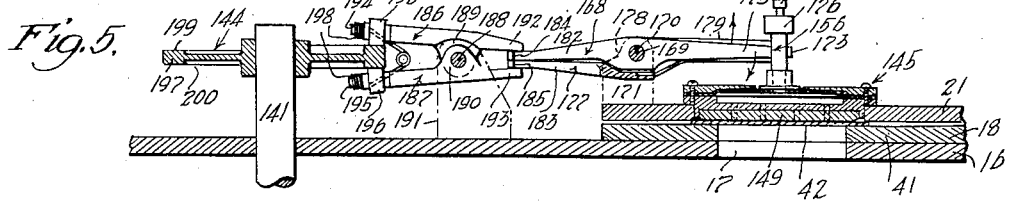
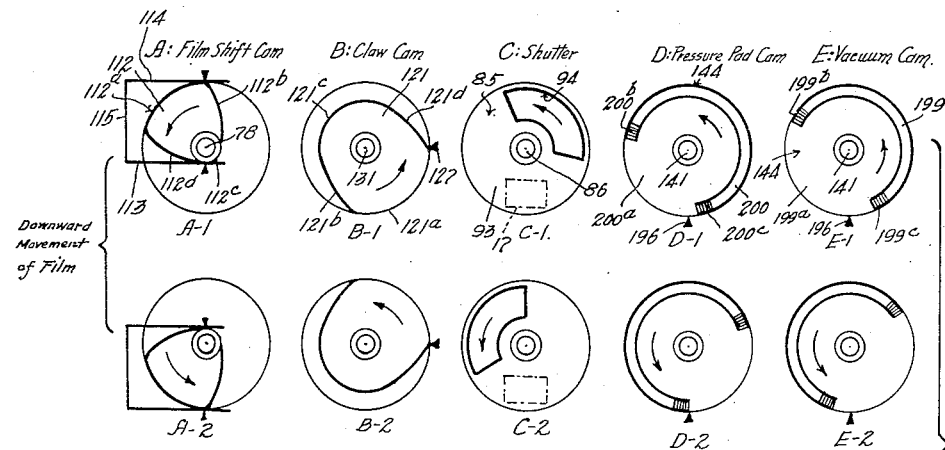
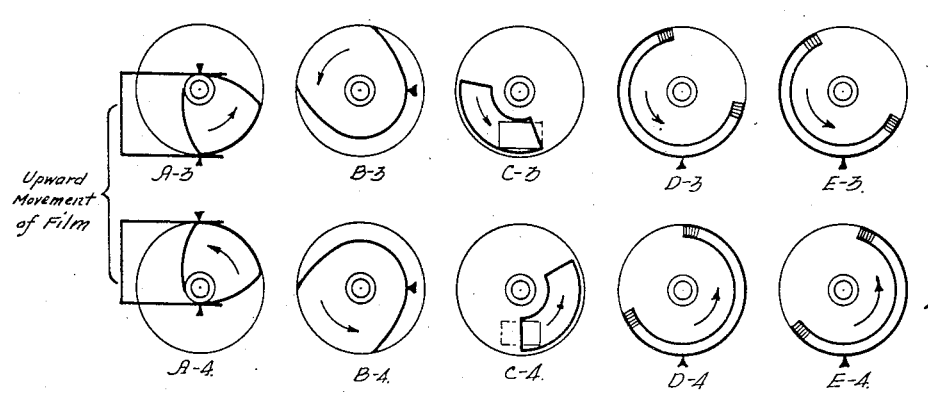
Inventor:  
Lloyd Brown.  
By James T. Barkeley.  
His Attorneys Patented Jan. 20, 1925.

1,523,857

UNITED STATES PATENT OFFICE.

LLOYD BROWN, OF SHERMAN, CALIFORNIA, ASSIGNOR, BY MESNE ASSIGNMENTS, TO C. B. HURTT, W. F. PETERSON, GEORGE BAYNE STEPHENS, AND CATHERINE BAYNE STEPHENS, ALL OF LOS ANGELES, CALIFORNIA, AND G. A. STEPHENS, OF MOLINE, ILLINOIS, TRUSTEES.

FILM-HOLDING MECHANISM FOR KINETOGRAPHS.

Application filed August 31, 1921. Serial No. 497,258.

*To all whom it may concern:*

Be it known that I, LLOYD BROWN, a citizen of the United States, residing at Sherman, in the county of Los Angeles and State of California, have invented a new and useful Film-Holding Mechanism for Kinetographs; and I hereby declare the following to be a full, clear, and exact description of the invention, such as will enable others skilled in the art to which it appertains to make and use the same.

My invention relates generally to kinetographs, and specifically to a film holding mechanism, operative in connection with the film actuating means thereof; and is designed for use in connection with standard cameras of this character.

Broadly speaking, my device performs the function of precisely framing the film in the exposure aperture during exposure, holding it by suction in a manner to remove any possible bulge in it, due to its pressure against the aperture plate, or due to any slight corrugations or bulges in the film itself, and then releases it to ride clear of the aperture plate during movement.

In kinetograph construction it is necessary to provide adequate space between the film race-way or aperture plate and the aperture gate to permit the film to ride freely therebetween, in its course through the machine, in order to guard against abrading the sensitized emulsion by too close contact with the aperture plate. At the same time this space must be made sufficiently limited to insure the presentation of a flat film surface for exposure in the aperture, and clean-cut framing by close contact with the aperture plate. The latter is generally accomplished at the sacrifice of the former, resulting in the production of films which are badly streaked with vertical scratches.

It is therefore the foremost object of my invention to overcome the aforementioned objectionable features in kinetograph construction, by providing a mechanism which will permit a maximum space between the race-way or aperture plate and aperture gate, or greater than has heretofore been found practicable, thereby practically obviating the possibility of abrading the emulsion, and also one which will insure close contact between the film and aperture plate during exposure, presenting a perfectly flat film surface for exposure, and securing clean-cut framing.

The merits of my invention will be disclosed in detail in the following specification, reference being made to the accompanying drawings, wherein I have illustrated the preferred form of my device, and in which:

Fig. 2 is a transverse vertical section through the same taken as indicated by the line 2—2 of Fig. 1;

Fig. 4 is a detail view showing my improved film-holding mechanism, parts being shown in elevation, and other parts being shown in section, taken as indicated by the line 4—4 of Fig. 3; and showing it in inoperative position.

Fig. 5 is a view similar to that shown in Fig. 4, and showing the mechanism in film holding position;

Fig. 7 is a plan view of the pressure pad, taken as indicated by the line 7—7 of Fig. 6, it being shown in its normal size in this figure;

Fig. 8 is a fragmentary section on line 8—8 of Fig. 3;

Fig. 9 is a diagrammatic lay-out showing the relative positions of the film shift, claw, shutter, pressure pad and vacuum cams, during one complete cycle of the machine or the downward shift and photographing of one picture.

Figure 1:
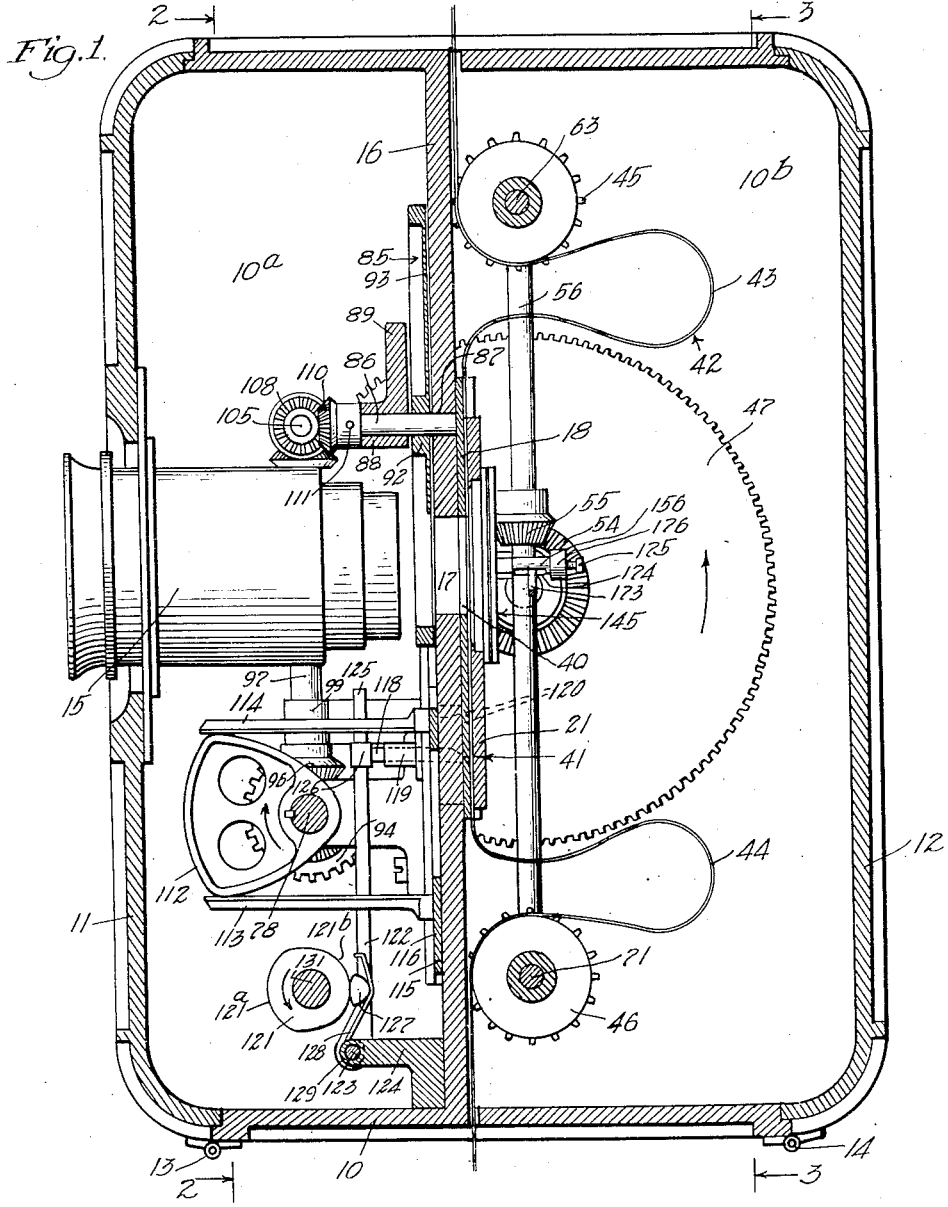
Fig. 1 is a longitudinal vertical section taken through the center of a typical kinetograph in which my invention is used.

Referring now particularly to Fig. 1, the numeral 10 designates a camera case-constructed of any suitable material, having front and rear doors 11 and 12, hinged at 13 and 14, respectively, for gaining access to the interior mechanism; a suitable lens housing 15, containing the lens organization, being rigidly mounted in the front door 11. A partition 16, extends transversely across the case 10—intermediate the front and rear doors 11 and 12—on which is mounted the bulk of the film actuating mechanism, and forming a lens chamber 10ª and a film chamber 10ᵇ. An exposure aperture 17, of the usual dimensions and configuration, is cut in the partition 16 in co-axial alignment with the lens in the housing 15.

A rectangular door-like film race-way 18 is hingedly mounted on the partition 16 in the film chamber 10ᵇ, adjacent the aperture 17, by means of hinge pins 19, passing through hinge bearings 18ª on the race-way and bearing lugs 20 on the said partition. An aperture gate 21, is likewise pivotally mounted on the hinge pins 19, by means of hinge bearings 21ª, and is adapted to swing over the race-way 18, to properly guide the film in its travel past the exposure aperture. The gate 21 is adapted to swing open relative to the race-way 18, and the race-way 18 is likewise adapted to swing relative to the partition 16. This arrangement is provided in case it is desired to use one of my focusing devices as shown and described in co-pending applications for United States Letters Patent filed May 24, 1921 Serial No. 472,195 and filed May 24, 1921 Serial No. 472,194.

Any suitable form of latch mechanism may be provided for releasably holding the gate 21 closed over the race-way 18, the one here shown consisting of a pair of oppositely disposed plates 22, carrying detents 23, the latter being adapted to engage notches in lugs 24 carried on the race-way 18. The plates 22 are slidingly mounted on the gate 21 by means of securing plates 25, secured in place by screws 26. Each of the plates 22 have an upwardly extending lug 27, adapted to be moved toward each other by the thumb and finger, of one hand, to withdraw the detents 23 from the lugs 24, thereby releasing the catch. The plates 22 are held normally separated, so that the detents 23 will yieldingly engage the notches of lugs 24, by means of a flat U-shaped spring 28, mounted on the gate 21 between the lugs 27 so the free ends will press against them, as clearly shown in Fig. 3. Thus it will be seen that the gate 21 can be opened relative to the race-way 18, by releasing these catches, and when the race-way 18 is swung about the hinge pins 19, it will carry the gate 21 with it.

The race-way 18, while carrying the gate 21, as above stated, is adapted to be opened relative to the partition 16 from the exterior of the camera case, by means of a hand lever 30 rigidly mounted on a shaft 31, and secured thereto by a pin 32. The shaft 31 is revolubly journaled on the partition 16, in bearings 33, secured by means of screws 34; and extending loosely through the top of the camera case. The shaft 31 is operatively connected to the race-way 18 by means of a bifurcated arm 35, rigidly secured to the bottom thereof, which in turn is connected with a bifurcated lug 36, on the race-way 18, by means of a connecting link 37, secured in place by pivot pins 38 and 39.

The race-way 18 has an exposure aperture 40, cut through it, the race-way being adapted to fit snugly against the partition 16, so this aperture will register perfectly with the aperture 17, as clearly shown in Fig. 1. The gate 21 is so mounted, relative to the race-way 18, that when the two are closed and in operative position, as shown in Fig. 1, there will be a space 41 between them to accommodate the film 42, passing therebetween. In threading the film 42 into the camera, as will be fully hereinafter explained, loops 43 and 44, are formed in the film, intermediate the upper sprocket wheel 45 and the top of the gate 21, and the lower edge of the gate and the sprocket 46. This arrangement is very common practice in the operation of kinetographs, and in connection with my device, I take advantage of this feature to permit the opening of the gate 21 and the race-way 18, relative to the partition 16, from the exterior of the case by means of the hand-lever, and its connecting media.

Figure 3:
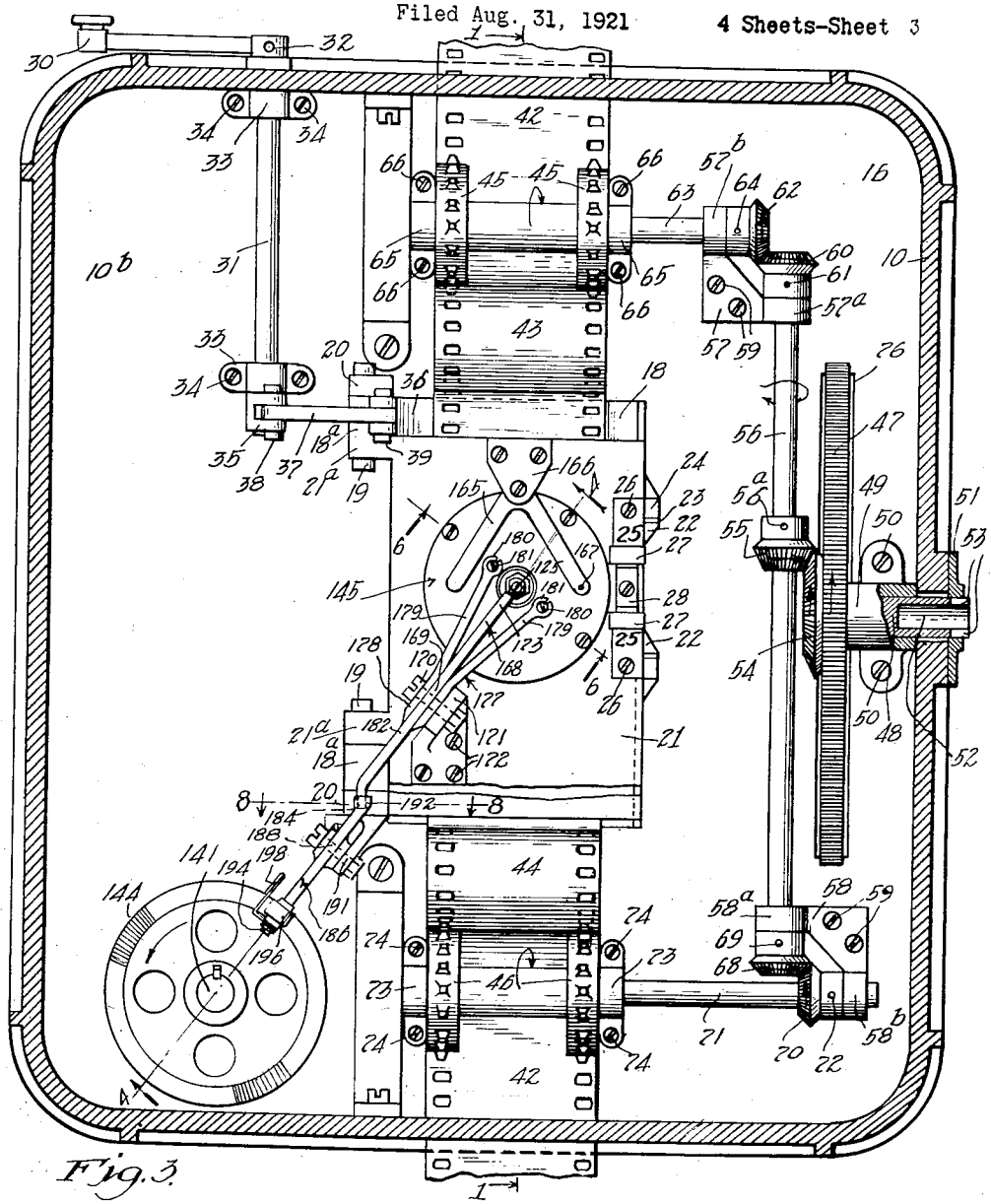
Fig. 3 is a transverse vertical section opposite to that shown in Fig. 2, and taken as indicated by the line 3—3 of Fig. 1.

Referring now particularly to Figs. 1, 2 and 3, the film and shutter actuating mechanism is as follows:

A spur gear 47 is rigidly mounted on main drive shaft 48, which in turn is revolubly journaled in a bearing 49, secured to the partition 16 by means of screws 50; the shaft 48 extending through the side wall of the case 10, and having its outer extremity supported in a collar bearing 51, secured to the exterior of the case. The shaft 48 has a bore 52 and diametrically opposed slots 53 extending inwardly from its outer end, a short distance, the bore and slots being adapted to receive a hand crank (not shown) for manually rotating the drive gear 47. This, it is well known, is the usual method of actuating a kinetograph.

A bevel gear 54, preferably formed integral with the gear 47 and rotating therewith, is adapted to mesh with a similar gear 55, rigidly mounted on a vertically disposed shaft 56, by means of a pin 56ª; the shaft 56 being revolubly mounted in bearing arms 57ª and 58ª of bearing blocks 57 and 58, secured to the partition 16, by means of screws 59. A beveled gear 60 is rigidly secured to the upper end of the shaft 56 by means of a pin 61, and meshes with a similar gear 62, rigidly mounted on a horizontally disposed shaft 63 by means of a pin 64. The shaft 63 is journalled in bearings 65, mounted on the partition 16 by means of a screws 66, the end of this shaft adjacent the gear 62 passing through the bearing arm 57ᵇ of the bearing block 57.

A beveled gear 68, is likewise secured to the opposite end of the shaft 56, by means of a pin 69, and meshes with a similar gear 70, rigidly secured on the horizontally disposed shaft 71 by means of a pin 72. The shaft 71 is revolubly journaled in bearings 73, secured to the partition 16 by means of screws 74; the outer end of this shaft being further suported in the bearing arm 58ᵇ of the bearing block 58.

The film sprockets 45 and 46 are keyed to the shafts 63 and 71, respectively, these being provided for the purpose of feeding the film 42 into and out of the interior of the case 10, from a suitable feed reel (not shown) adapted to be mounted on the top of the case, and onto a similar take-up reel (also not shown) adapted to be mounted on the bottom of the case.

The foregoing constitutes the mechanism for feeding the film 42 through the film chamber 10ᵇ, from a feed reel, past the exposure aperture, and onto a take-up reel, the gears, shafts and sprockets, above described, revolving in the directions indicated by the arrows. The kinetograph here described is designed to take standard pictures, that is, sixteen exposures per second, although it will be obvious that this may be altered to suit circumstances, without departing from the spirit of my invention and for this purpose the main drive shaft 48 is to be rotated at two revolutions per second. The ratio of the gears 54 and 55, is one to two, consequently the shaft 56 will be revolved at the rate of four revolutions per second. The gears 60 and 62, and 68 and 70, are of a ratio of one to one, therefore the shafts 63 and 71 will likewise be rotated at the rate of four revolutions per second; and the sprockets 45 and 46, being standard and revolving with the shafts 63 and 71 at the rate of four revolutions per second, they will feed aproximately twelve inches of film through the camera per second, or sufficient for sixteen exposures.

The drive gear 47 extends through a slot 76, in the partition 16, and into the lens chamber 10ᵃ, see Figs. 1 and 2, for the purpose of actuating the shutter and intermittent film actuating mechanism located therein.

Referring now to Figs. 1 and 2, and particularly to Fig. 2, the gear 47 meshes with a similar gear 77, keyed upon a shaft 78; the shaft 78 being revolubly journaled in bearings 79, 80, 81 and 82, which in turn are supported on the partition 16 by means of screws 83. A suitable fly wheel 84 is mounted upon the shaft 78, on the end opposite to its driven end, for the purpose of balancing the movement.

A shutter 85 is rigidly mounted upon a shaft 86, this shaft being revolubly supported above the exposure aperture 17, one end being journaled in a bearing 87 in the partition 16, and the other end passing through a bearing 88, in a bearing support 89 mounted on a partition 16, by means of screws 90; the shutter 85 being adapted to rotate intermediate the support 89 and the partition 16, so its circumferential area will cut the axis of the exposure aperture 17. The shutter 85 may be of any preferred construction, and is here shown as comprising an annular rim 91, supported on a hub 92 by means of an intermediate opaque portion 93, see Figs. 1 and 2; the opaque portion 93 having an arcuate aperture 94 for the purpose of permitting the object to be intermittently exposed to the film 42 between its intermittent movements.

The mechanism for driving the shutter 85 consists of a beveled gear 94, keyed to the shaft 78 by means of a pin 95, and meshing with a similar gear 96, likewise keyed to a vertically disposed shaft 97 by means of a pin 98; the shaft 97 being revolubly journaled in bearings 99 and 100, secured to the partition 16 by means of screws 101. A beveled gear 102, keyed to the upper end of the shaft 97 by means of pin 103, meshes with a similar gear 104, keyed to a horizontally disposed shaft 105 by means of a pin 106; the shaft 105 being revolubly journaled in a bearing 107, preferably formed integral with the support 89. A bevel gear 108, keyed to the shaft 105 by means of pin 109, meshes with a similar gear 110, likewise keyed to the outer end of shaft 86, by means of a pin 111. Thus it will be seen that rotation of the shaft 78 will cause rotation of the shutter 85 through the above-described connecting media.

The film 42 is intermittently actuated in its course through the camera by means of a triangular cam 112, keyed to the shaft 78 and contacting with parallel cam bars 113 and 114, which, in turn, are mounted on a plate 115. The plate 115 is slidingly mounted to vertically reciprocate between guide rails 116, secured to the partition 16 by suitable screws 117. Rotation of the cam 112 will cause vertical reciprocation of the plate 115 between the guide rails 116.

The film 42 may be intermittently actuated, in the usual manner, by means of a pair of claws 118 engaging the perforations of the film and mounted to slide horizontally in bearing sleeves 119, supported on the slide 115. The claws 118 are vertically reciprocated with the slide 115, and they extend into elongate vertical apertures 120, shown in dotted lines in Fig. 1, there being similar elongate apertures in the race-way 18 which register with these apertures. The claws 118 are actuated to grip and release the film 42, at the proper intervals, by means of a pair of typical cams 121 and typical cam levers 112. The cam levers 122 are pivotally mounted on a short horizontal shaft 123, supported in a bearing block 124, their upper ends 125 extending through sleeves 126 formed integral with the claws 118. This form of connection permits the vertical movement of the plate 115 to move the film, while at the same time controlling the horizontal movement of the claws to engage and disengage the perforations therein. Each of the levers 122 has a shoe 127 adapted to contact with the periphery of the cam 121, and they are held normally in such contact by means of springs 128. The springs 128 also serve to hold the levers 122 in horizontal aligment, and against the central portion 129 of the bearing block 124, they being held on the shaft 123 by means of cap-screws 130. The cams 121 are keyed to a horizontal shaft 131 by means of pins 132; the shaft 131 being revolubly journaled in bearing 133, secured to the partition 16 by means of screws 134. Shaft 131 is driven by a spur gear 135, keyed to the shaft 78 by means of a pin 136, and meshing with a similar gear 137 keyed to the said shaft 131 by means of a pin 138.

The ratio of the gears 77 and 47 is 8 to 1, therefore, the gear 47 being rotated at the rate of two revolutions per second, the shaft 78 will be driven at the rate of 16 revolutions per second. The bevel gears 94 and 96, 102 and 104, and 108 and 110, are all of a one to one ratio, and therefore the shutter 85 will also be driven at the rate of sixteen revolutions per second. The cam 112, mounted on the shaft 78, will make sixteen revolutions per second, thus causing the plate 115 to make 32 movements per second, or sixteen upward and sixteen downward movements per second. The spur gears 135 and 137 are also of a one to one ratio, therefore the shaft 131 will also be driven at the rate of sixteen revolutions per second, as will also the cams 121 mounted thereon.

The cams 121 are so set on the shaft 131 relative to the cam 112, that during the downward movement of the plate 115 by the action of the latter, the cam levers 122 will be moved inwardly toward the partition 16, to the right in Fig. 1, by contact of the shoes 127 with the cam surfaces 121ª, causing the claws 118 to engage the perforations of the film 42 and move it downwardly the height of one picture or exposure. At the bottom of this movement the shoes 127 ride from the cam surfaces 121ª to the cam surfaces 121ᵇ, thereby permitting the claws 118 to be withdrawn from the film perforations, by the action of the springs 128 on levers 122, and they will remain in such withdrawn position until the plate 115 reaches the limit of its upward movement, when the operation is repeated. All of the shafts, gears, cams, etc., in the lens chamber 10ª, above mentioned, rotate in the directions indicated by the arrows thereon.

The details of the film holding mechanism are as follows; A beveled gear 139, preferably formed integral with the gear 137, meshes with a similar gear 140, keyed to a stub-shaft 141. The ratio of these gears are one-to-one, and therefore the shaft 141 is driven at the rate of sixteen revolutions per second. The shaft 141 extends through the partition 16, which forms one of its bearings, the opposite end being journaled in a bearing 142, in the lens chamber 10ª, which is secured to the partition 16 by means of screws 143. A cam wheel 144 is keyed to the shaft 141, in the film chamber 10ᵇ, the function of which will be more fully hereinafter explained.

Referring now particularly to Figs. 3, 4, 5 and 6, my improved film holding means consists of a vacuum pad designated generally by the numeral 145, mounted in the aperture gate 21, and actuated, through suitable connecting media, by means of the cam wheel 144. This vacuum pad, shown in detail, in Figs. 4, 5 and 6, comprises a circular pressure pad frame or support 146, having an annular flange 147, extending outwardly from its inner face, and forming a circular seat 148 in which is mounted a pressure pad 149. The film contact surface 150, of the pressure pad 149, extends outwardly a mere fraction of an inch beyond the outer edges of the annular flange 147. It may be constructed of any suitable material, and preferably of black agate or a like substance. Black agate has been used for this purpose with very satisfactory results, owing to its wearing qualities, minimum friction produced, and for the reason that it has a very slight tendency to reflect light rays.

Figure 6:
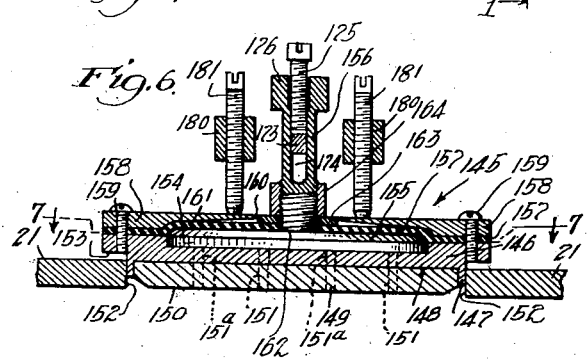
Fig. 6 is an enlarged detail transverse vertical section through the holding head and taken as indicated by the line 6—6 of Fig. 3.

The pressure pad 149 has a plurality of minute perforations 151 extending axially through it, these perforations being co-axial with a similar number of perforations 151ª likewise extending through the pressure pad holder 146, and shown in dotted lines in Fig. 6. Any number of perforations 151 may be provided in the pressure pad 149, but the number and arrangement, as shown in Fig. 7, is preferable, this number being found best to accomplish the desired results. The pressure pad 149 is preferably of a diameter sufficient to completely cover one standard picture or exposure of the film, this being shown in dot dash lines in Fig.

7, and ordinarily measuring three quarters of an inch in height by one inch in width. It is obvious, however, that the pressure pad 149 may be made square or rectangular, to suitably conform to the standard dimensions of a picture or exposure, with equally satisfactory results.

The pressure pad frame 146 is mounted axially slidable in a circular aperture 152, in the gate 21, the annular flange 147 fitting into said aperture, the shoulder 153 being adapted to abut against the outer face of the gate to limit the inward movement of the pressure pad. The frame 146 has a concentric annular recess 154, which will hereinafter be referred to as the vacuum chamber, this said recess being of such a diameter that the perforations 151ª communicate therewith. A circular plate or disc 155, to be hereinafter termed the diaphragm plate, fits snugly in the vacuum chamber 154, and is of such a size that while it fits snugly in this chamber, it is also readily horizontally slidable therein by slight pressure; this plate having an axial post 156, preferably formed integral therewith. A diaphragm 157, constructed of thin rubber, or a similar flexible material, extends over the top of the frame 146, and over the top of the plate 155, and is securely held in this position by means of a diaphragm cover 158; the diaphragm 157 being confined adjacent its periphery between the frame 146 and the cover 158; the latter being secured to the former by means of suitable screws 159. The cover 158 has a circular aperture 160, in its center, through which the post 156 extends, and it is also recessed at 161, for the reception of the diaphragm 157, when it is in the position shown in Fig. 6. The diaphragm 157 is apertured at 162 to fit around the post 156 and is clamped tightly against the plate 155, by means of a washer 163, held in place by means of a nut 164 screw-threadedly engaging the lower end of the post 156. Thus it will be seen that with the construction just described, the plate 155 fitting tightly into the vacuum chamber 154, and being effectively sealed from the rear by means of the diaphragm 157, the whole being adapted to be moved axially in the vacuum chamber 154, as will be more fully hereinafter explained, will create a vacuum in the said chamber 154, or a rarification of the air therein, when the perforations 151 are sealed by the pressure pad 149 contacting with the film 42 and the latter will be securely held against the pressure pad 149 by such suction.

As above stated, the vacuum pad 145, as a whole, is mounted longitudinally slidable in the gate 21, and it is normally held against displacement therefrom by means of a bifurcated leaf spring 165, contacting with its outer face, the latter being supported in a suitable bearing 166. A small pin 167, passing through one of the arms of the spring 165, extends into the diaphragm cover 158, to prevent the pad as a whole from rotating in its bearing.

The vacuum pad 145 is actuated in the following manner: A rocker arm 168 is pivotally mounted at 169 on a pin 170, which in turn is supported in a bearing 171, mounted on the gate 21. The bearing 171 may be secured to the gate 21 in any suitable manner, as by screws 172. One end 173, of the rocker arm 168, engages the post 156 by extending through a longitudinal slot 174 therein; the end 173 being adjustable, relative to the post 156, by means of a cap screw 175 screw-threadedly mounted in the upper end 176 of the said post. Inasmuch as the lever 168 is adapted to actuate the diaphragm, it will be hereinafter referred to as the diaphragm lever.

A second rocker arm 177, having a bifurcated bearing 178, extending on either side of the lever 168, is likewise pivotally mounted on the pin 170, and is bifurcated at one end forming arms 179; the outer ends of which arms are enlarged as at 180, for the reception of adjustable contact pins 181, screw-threadedly mounted therein. The rocker arm 177 operates to move the vacuum pad 145 inwardly, to contact with the film, and therefore will be hereinafter termed the pressure pad lever. The diaphragm lever 168 and the pressure pad lever 177 each have oppositely extending arm portions 182 and 183, respectively, each of which have downwardly depending portions 184 and 185, respectively, extending at an angle relative to the portions 182 and 183, as clearly shown in Figs. 3, 4 and 5, and as diagrammatically shown in Fig. 8.

A pair of cam levers 186 and 187 are pivotally mounted on a pin 188, passing through bearings 189 and 190, respectively, which pin is supported in a bearing 191, as clearly illustrated in Figures 3, 4 and 5. The cam levers 186 and 187, each have enlarged upper ends 192 and 193, respectively, adapted to contact with the outer opposite faces of the depending portions 184 and 185, of the levers 168 and 177. The opposite ends of these levers are reduced as at 194 and 195, respectively, these reduced portions have anti-friction roller bearings 196 mounted thereon, adapted to contact with opposite sides of the rim 197 of the cam wheel 144. The roller bearings 196 are held in normal engagement with the sides of the rim 197, by means of a wire spring 198, secured at its outer ends to each of the induced portions 194 and 195, as shown in Figs. 4 and 5.

The levers 168 and 177 are mounted diagonally on the gate 21, as shown in Fig.

3, and their lower depending ends 184 and 185, terminated opposite the pivotal center of the race-way 18 and gate 21, as shown diagrammatically in Fig. 8, to enable the race-way and gate to be opened, as hereinbefore described, and at the same time permit an operative engagement between the said levers and the cam levers 186 and 187, when the race-way and gate are closed. The upper ends 192 and 193 of the cam levers 186 and 187, it will be noted, terminate a slight distance below the lower edge of the raceway 18, to enable it to pass over them when it is opened. However, it is obvious that other constructions may be resorted to with equal effect.

The cam wheel 144 has cam surfaces 199 and 200 opposite sides of its rim 197, the said cam surfaces, during rotation of the wheel, being adapted to contact with the roller bearings 196, at proper intervals, thereby forcing these ends of the levers 186 and 187 apart, from the position shown in Fig. 4 to that shown in Fig. 5, thereby causing the opposite ends 192 and 193 to force together the depending ends 184 and 185 of the levers 168 and 177 resulting in the ends 173 and 179, of the said levers, being moved in opposite directions, or in the directions indicated by the arrows in Fig. 5, and causing vacuum pad 145, as a whole, to be moved inwardly against the film 42, and immediately thereafter causing a vacuum or suction of the said film against the pressure pad 149, by raising the plate 155 in the vacuum chamber 154. The outer end 173, of the lever 168, is normally held in engagement with the adjusting screw 175, by means of leaf spring 201 mounted upon the lever 177, and contacting with the underside of the portion 173. This also tends to hold the contact pins 181 in contact with the upper face of the diaphragm cover 158.

In the operation of my device the film is intermittently actuated by the camera in the usual manner, to expose say sixteen pictures per second, a suitable time being permitted for dwell during the exposure, and an appropriate interval allowed for movement of the film. My improved holding means is adapted to be held out of contact with the film during its movement and to be moved forward into engagement therewith on the instant of its stop, or immediately thereafter, after which the diaphragm is actuated to create the suction or vacuum, and consequent holding of the film during its dwell for exposure, and after which it is released in sufficient time for its next intermittent movement.

The timing of the various elements, to accomplish this object, is clearly set forth diagrammatically in Fig. 8, wherein the film shift, claw, shutter, pressure pad and vacuum cams are each shown in their relative positions during one complete cycle, or one complete movement and exposure of a picture; the elements being designated in columns by the letters A, B, C, D, and E, respectively.

Referring to the column A representing the film shift cam, the diagram A-1 shows the arrangement of the cam 112, on the shaft 78, and the cam bars 113 and 114 connected by the plate 115. The cam, cam bars and plate, are here shown in their uppermost position, the cam 112 being just ready to rotate in the direction indicated by the arrow thereon to carry the plate 115 on its downward stroke. Assuming the cam surface $112^a$ to be 80°, the surfaces $112^b$ and $112^d$ to be 100°, and the surface $112^c$ to be 80°, it is clear that the movement of the cam 112 from the position shown in diagram $A^1$, to that shown in diagram $A^2$, will amount to a rotation of the shaft 78 through an arc of 100°. Therefore, the downward movement of the film will require a period of time equal to an arc of 100° of the cycle of rotation of the cam 112. After the cam 112 reaches the point shown in diagram $A^2$, the film is at rest and ready for exposure, and remains at rest until the cam again reaches the position shown in the diagram $A^1$. The cam surface $112^a$ being 80°, the travel of the cam from the position shown in the diagram $A^2$ to that shown in diagram $A^3$, will consume 80° more of the arc of rotation of the shaft 78, and during this time the plate 115, together with the cam bars 112 and 113, are at rest in their lowermost position as shown. The cam surface $112^d$ being 100° the travel of the cam from the position shown in diagram $A^3$ to that shown in the diagram $A^4$ will consume another 100° of the arc of rotation of the shaft 78, thereby moving the plate 115, together with the cam bars 112 and 113, upwardly, from their lowermost position, as shown in the diagram $A^3$ to their topmost position as shown in the diagram $A^4$. The travel of the cam from the position shown in $A^4$ to that shown in $A^1$ consumes another 80°, or a total of 360° for the cycle. The diagrams $A^1$ and $A^2$ illustrate the downward movement of the plate 115, and $A^3$ and $A^4$ its upward movement with a dwell of 80° at the end of each.

The elements diagrammatically shown in the columns A, B, C, D and E, are intergeared at a ratio of one to one, consequently each will make one revolution in the same period of time. The cam 112 making one complete revolution in one-sixteenth of a second, which is one complete movement and exposure of one picture, each complete downward and upward movement of the plate 115 will consume five two-hundred and eighty-eighths of a second, while the dwell caused by the contact of the cam surfaces 112ª and 112ᶜ, with the cam bars 113 and 114, each being 80°, will consume four two-hundred and eighty-eighths of a second, or a total of one-sixteenth of a second for the complete revolution.

As each of the elements diagrammatically shown in Fig. 8, are interdependent upon or secondary to the movement and timing of the cam 112, their timing will be explained with it as a basis of movement. The claw cam 121, as diagrammatically shown in its several positions in the column D, rotates in the direction indicated by the arrow, the shoe 127, of the cam lever 122, contacting with its periphery at the point indicated by the arrowhead 127. The cam surface 121ª, contacting with the shoe 127, throws the cam lever 122 over so the claws 118 will engage the perforations of the film 42, during the downward movement of the plate 115. The cam surfaces 121ᵇ and 121ᵈ successively move the lever 122 in and out of film engaging position while the surface 121ᶜ permits the claws 118 to remain out of film engaging position. Referring to the diagram B¹, it will be noted that the cam 121 is mounted on the shaft 131, relative to the cam 112, so that the cam surface 121ª, which is 100°, is just starting in contact with the shoe 127 as the cam 112 and the plate 115 are starting downward on their film carrying movement. Thus claws 118 are moved into film engaging position, just as the cam 112 starts on its downward movement, and they are so held in such engagement by the surface 121ª, throughout this downward movement. When the trailing edge of the surface 121ª has reached the point of the arrowhead 127, shown in diagram B², the cam 121 has traveled through an arc of 100° of its rotation, and the film has been moved to the limit of its downward movement. After this the shoe 127 contacts with the cam surface 121ᵇ, which is 60° of its arc of rotation, and the claws 118 are removed from the perforations of the film by permitting the levers 122 to be moved outwardly by the springs 128.

Sixty degrees of rotation of these cams have been found ample time in which to withdraw the claws from the film, as it has also been found sufficient to effect engagement of the film by the claws; these movements taking place during the dwell or stationary period of the film, and also during the time the cam surface 112ª, of the cam 112, is in contact with either of the cam bars 113 or 114.

During the movement of the cam 112 from the position shown in diagram A¹ to that shown in diagram A², the cam 121 will move from the position shown in diagram B¹ to that shown in the diagram B²; and during this time the claws 118 are in film engaging position. During the travel of the cam 112 from the position shown in diagram A², to that shown in diagram A³, the cam 121 will move from the position shown in diagram B² to that shown in diagram B³, permitting the shoe 127 to ride over the cam surface 121ᵇ, withdrawing the claws 118 from engagement with the film. During the travel of the cam 112 from the position shown in diagram A³ to the position shown in diagram A⁴, the cam 121 will travel from the position shown in diagram B³ to that shown in diagram B⁴, which is during the upward movement of the plate 115 carrying the claws 118 with it, the shoe 127 will be in contact with the cam surface 121ᶜ thus holding the claws 118 out of engagement with the film. During movement of the cam 112 from the position shown in diagram A⁴, to that shown in diagram A¹, the cam 121 will move from the position shown in diagram B⁴, to that shown in diagram B¹, the shoe 127 riding over the cam surface 121ᵈ, toward the cam surface 121ª, moving the lever 122, carrying the claws 118, over and into engagement with the film 42, and ready to carry the film downwardly with the plate 115, as it will be moved by the cam 112 during the next succeeding movement.

The shutter, as diagrammatically shown in the column C, is mounted to rotate on the shaft 86, in the direction indicated by the arrow; the shutter opening 94 being 120°. This opening, it has been found, is ample to give proper exposure to the film during the exposure of sixteen pictures per second, and is practically standard. This shutter, as above stated, is geared one to one with cams 112 and 121, and therefore makes sixteen revolutions per second. It will be noted that it is mounted on the shaft 86 so that the opaque portion 93 covers the aperture 17, as shown in the diagram C¹, during the downward movement of the film, as shown by the relative positions of the aforementioned cams. During the movement of the cam 112 from the position shown in the diagram A¹ to that shown in the diagram A², which is the downward movement of the film, the shutter opening 94 moves from the position shown in the diagram C¹ to that shown in diagram C². During movement of the cam 112 from the positions shown in diagrams A² and A³, to the position shown in diagram A⁴, the shutter opening 94 travels from the position shown in diagrams C², to those shown in the diagrams C³ and C⁴, thereby uncovering the aperture 17 and exposing the film therethrough, while the latter is stationary. During movement of the cam 112 from the position shown in the diagram A⁴ to that shown in the diagram A¹, the shutter travels from the position shown in C⁴ to the position shown in C¹, completing the exposure of the film and covering the aperture for movement of the film during the next succeeding movement of the cam 112.

It is necessary in camera construction that the film remain stationary a length of time equal to the travel of the shutter opening past the exposure aperture plus the angle of the aperture measured from the axis of the shutter. In this case the shutter opening 94 being 120°, and the aperture 17 being practically 72°, it is therefore necessary that the film remain stationary a length of time equal to the travel of the cam 112 through an arc of 192°. This is clearly possible as the film in this case is only moving during rotation of the several cams through an arc of 100 degrees, thereby leaving a total of 260° for the exposure of the film.

The pressure pad cam 200, as diagrammatically shown in the column E, is mounted on the shaft 141 to rotate in the direction indicated by the arrow; the roller bearing 196, indicated by the arrowhead, contacting with the cam surface at the point shown. This cam moves the vacuum pad 145, axially in its seat 152 in the gate 21, which incidentally carries the pressure pad 149 into and out of contact with the film 42, in the space 41 between the said gate and the raceway 18. It accomplishes this movement by contact with the roller bearing 196 on cam lever 187, which in turn actuates the pressure pad lever 177, the latter contacting with the upper face of the diaphragm cover through the arms 179 and contact screws 181. It is pointed out that when the pressure pad lever 177 is resting in its normal position, as shown in Fig. 4, permitting the vacuum pad 145 to move to its outermost position, this movement is facilitated, and the top of the diaphragm cover held in engagement with the screws 181, by the action of the leaf spring 201 which tends to move the ends 173 and 179 of these levers in opposite directions. The ready movement of the pressure pad as a whole, to its outermost position, when the aforementioned levers are in the stated position, is accomplished by the action of the rubber diaphragm 157, which tends to hold the plate 155 seated in the vacuum chamber 154, thereby moving the vacuum pad relative to the post 156.

The pressure pad 149 is moved outwardly and into engagement with the film 42 immediately after it comes to rest, or immediately after the cam 112 reaches the point shown in the diagram A²; therefore, the cam 200 is mounted on the shaft 141, relative to the cam 112, as shown in the diagram D¹, so the cam surface 200 will contact with the roller bearing 196 and actuate the vacuum pad during the time the film 42 is at rest and being exposed. During the time the roller bearing 196 is riding over the surface 200ᵃ the vacuum pad is in inoperative position, as shown in Fig. 4. This surface covers approximately 108° of the arc of rotation of the cam wheel 144, or slightly more than the movement of the cam 112 in moving the film downwardly; and the film is being moved downwardly during the time the roller bearing is in contact with this surface. The shaded portions 200ᵇ and 200ᶜ, of these diagrams, represent the cam surfaces extending from the lower plane 200ᵃ to the upper plane or cam surface 200, and these surfaces are substantially 15° in length, an amount sufficient to effect the movement of the pressure pad into and out of operative position.

During the movement of the cam 112 from the position A¹ to the position A², the cam wheel 144 rotates, in the direction indicated by the arrow, from the position shown in the diagram D¹ to the position shown in the diagram D², during which time the film 42 is moved downwardly and the roller bearing 196 rides over the surface 200ᵃ, the wheel 144 revolving through 100° of its arc of rotation. When the cam 112 and cam wheel 144 have reached the positions shown in the diagrams A² and D², respectively, the film 42 is stationary and in position for exposure, and during the next succeeding movement the cam wheel 196 rides over the cam surface 200ᵇ and onto the cam surface 200, thereby forcing the pressure pad 149 outwardly and in contact with the film 42, in the space 41, as clearly shown in Fig. 5. The cam surface 200, being of a length equal to 222° of the arc of rotation of the wheel 144, that is, an arc equal to the length of the shutter aperture 94 and the angle of the aperture 17, the cam wheel 196 will ride over the surface 200, from immediately after the position shown in diagram D² until immediately before the position shown in the diagram D¹, passing through the positions shown in D³ and D⁴, and during the time the cams 112 and 121, and the shutter 85, travel from the position shown in A², B² and C², through the positions shown in A³, B³ and C³, and A⁴, B⁴, and C⁴, and to the position shown in A¹, B¹ and C¹. Thus, during the time, or throughout a period beginning immediately after the film is moved downwardly and comes to rest, the pressure pad 149 is moved outwardly in contact with it and remains so until just before the film is again ready to be moved downwardly after the exposure.

The vacuum cam 199, being also formed on the wheel 144, rotates about the shaft 141, in the direction indicated by the arrow, exactly the same and at the same time as the cam 200, although on the opposite side of the wheel. Inasmuch as this cam actuates the vacuum or suction function of the pressure pad 149, it therefore does not effect the actuation of these elements until after the pressure pad has been moved into operative position by the cam 200. This cam actuates the diaphragm plate 155, in the vacuum chamber 154, through the medium of the roller bearing 196 on the cam lever 186, the lever 168 and post 156, immediately after the cam 200 has pressed the pressure pad 149 into operative engagement with the film, and continues so until just immediately before the cam 200 releases the pressure pad and permits it to withdraw to inoperative position; therefore, the cam surface 199ª is 138°, and the surface 199 is 192°. The latter is designed to hold the vacuum on the film 42 throughout the rotation of the shutter 85 through an arc equal to the sum of the shutter aperature 94 and the exposure aperture 17, or a total of 192°

During the time the cam 112 is moving from the position shown in diagram $A^1$ to that shown in the diagram $A^2$, the roller bearing 196, as designated by the arrow head, is traveling over the surface 199ª, during which time the diaphragm plate and diaphragm are in the position as shown in Fig. 4. During the time the cam 112 is moving from the position shown in diagram $A^2$, to that shown in diagram $A^3$, and $A^4$, the wheel 144 is rotating from the position shown in $E^2$, to the positions shown in $E^3$ and $E^4$. During this time the exposure is taking place, as indicated by the various positions of the shutter in the column C, and the vacuum is being drawn on the film 42. Just prior to the time the cam 112 reaches the position shown in diagram $A^1$, and after the shutter has completed its exposure of the film, the roller bearing 196 on the cam lever 186 rides off the surface 199 over the surface 199ᶜ and onto the surface 199ª, releasing the vacuum as it passes over the surface 199ᶜ.

It is pointed out that the pressure pad 149 is not moved into operative position by the cam 200 until after the film has come to rest, and just before the shutter aperture 94 uncovers the exposure aperture 17, and immediately after this pressure pad has been moved into operative position, then the vacuum on the film is exerted by the cam 199. Thus it is shown how my improved film holding device is timed with the several moving elements of the camera, in exact synchronism to produce perfect results.

The film is first moved downwardly to its point of rest, and during a suitable interval of movement the claws are withdrawn from the film, after which the cam 112, continuing in its movement, raises the plate 115, carrying the claws 118, from its lowermost to uppermost position, allowing for certain intervals of dwell by contact of the cam surface 112ª with the cam bars 113 and 114. During the stationary position of the film the shutter is properly timed to make the exposure through the aperture 17, the pressure pad being moved into operative position, and the vacuum placed on the film just before the shutter uncovers the said aperture; the vacuum then first being released and thereafter the pressure pad moved out of operative engagement with the film, during which time the opaque portion 93 of the shutter is covering the exposure aperture 17, and the film is again released and in readiness for its next movement.

While I have here shown and described the preferred embodiment of my invention, it is nevertheless understood that I reserve the right to make any changes or modifications in structure, or timing of the elements, which properly come within the scope of the appended claims.

Having described a preferred form of my invention, I claim:

1. The combination with a kinetograph, of means to hold the film during exposure thereof, said means comprising a movable member normally out of contact with the film, means to move said member into contact with the film, and suction means to hold the film in contact therewith.

2. The combination with a kinetograph, of means to hold the film during exposure thereof, said means comprising a movable member normally out of contact with the film, means to move said member into contact with the film, and suction means operable to hold the film in contact with said member after its contact therewith.

3. The combination with a kinetograph, of means to hold the film during exposure thereof, said means comprising a member movable to contact with the film, and means operable to hold the film in contact therewith by suction after such contact.

4. The combination with a kinetograph, of means to hold the film during exposure thereof, said means comprising a movable member normally out of contact with the film, means operable to move said member into contact with the film during its dwell, and suction means operable to hold the film in contact with said member after its contact therewith.

5. The combination with a kinetograph having a film moving and exposing mechanism, of means in connection with said mechanism to hold the film during exposure thereof, said means comprising a movable member normally out of contact with the film, means operable to move said member into contact with the film during its dwell, and suction means operable to hold the film in contact with said member after its contact therewith.

6. The combination with a kinetograph, of means to hold the film during exposure thereof, said means comprising a member adapted to be moved into contact with the film, and fluid pressure means to hold the film in contact therewith.

7. The combination with a kinetograph having a film moving and exposing mechanism, of means in connection with said mechanism to hold the film during exposure thereof, said means comprising a movable member normally out of contact with the film, means operable to move said member into contact with the film during its dwell, and fluid pressure actuating means operable to hold the film in contact with said member after its contact therewith.

8. The combination with a kinetograph having a film moving and exposing mechanism, of means in connection with said mechanism to hold the film during exposure thereof, said means comprising a movable member normally out of contact with the film, means operable to move said member in and out of contact with the film during its dwell, and fluid pressure actuating means operable to hold the film in contact with said member after its contact therewith.

9. The combination with a kinetograph having a film moving and exposing mechanism, of a hingedly mounted aperture gate, means in connection with said mechanism to hold the film during exposure thereof, said means comprising a member movably mounted in the aperture gate, means operable to move said member in and out of contact with the film during its dwell, and fluid pressure means operable to hold the film in contact with said member during contact therewith.

10. The combination with a kinetograph, of means to hold the film during exposure thereof, said means comprising a hingedly mounted film confining gate, a film contacting member movably mounted in the gate and adapted normally to be out of contact with the film and to be moved into contact with the film during its dwell, means for creating a suction in the film engaging face of said member to hold the film in engagement therewith, an operating arm for the film contacting member mounted on and swinging with the hinged gate, an operating arm for the suction producing means likewise mounted on the gate, and actuating means mounted independently of the gate and comprising actuating members adapted to engage and operate said arms, and said arms adapted to swing into operative engagement with said actuating members when the film gate is moved to its normal film confining position.

11. In a device of the character described, members providing a film race-way, a movable film engaging member mounted on one of said race-way members and movable to and from the surface of the film, a flexible diaphragm mounted on and moving with said film engaging member and movable also with relation thereto to create a suction at the film engaging surface of said member; means to move said member to and from the film, and means to move said diaphragm relative to said member.

12. In a device of the character described, members providing a film race-way, a movable film engaging member mounted on one of said race-way members and movable to and from the surface of the film, a flexible diaphragm mounted on the back side of said film engaging member, the film engaging member having apertures leading from under the diaphragm to its film engaging face, means to move the film engaging member into and out of contact with the film, and means to cause relative movement of the diaphragm away from the film engaging member when said member is moved into contact with the film.

13. In a device of the character described, members providing a film race-way, a movable film engaging member mounted on one of said race-way members and movable to and from the surface of the film, a flexible diaphragm mounted on the back side of said film engaging member, the film engaging member having apertures leading from under the diaphragm to its film engaging face, means to move the film engaging member into and out of contact with the film, and means to cause relative movement of the diaphragm away from the film engaging member when said member is moved into contact with the film; said last two mentioned means embodying two actuating arms one connected with the film engaging member and the other connected with the diaphragm, and cam actuated means to move said arms in opposite directions.

In witness that I claim the foregoing I have hereunto subscribed my name this 16th day of May 1921.

LLOYD BROWN.

Witnesses:
  Geo. R. Althoff,
  J. B. Kendall.